United States Patent [19]
Huber

[11] 3,859,701
[45] Jan. 14, 1975

[54] BONDING OF RUBBER TO MAGNESIUM AND ITS ALLOYS

[75] Inventor: Raymond B. Huber, Willow Street, Pa.

[73] Assignee: Armstrong Cork Company, Lancaster, Pa.

[22] Filed: Dec. 26, 1973

[21] Appl. No.: 427,919

Related U.S. Application Data

[62] Division of Ser. No. 225,432, Feb. 11, 1972, Pat. No. 3,802,989.

[52] U.S. Cl. ................................................. 29/132
[51] Int. Cl. .......................................... B21b 31/08
[58] Field of Search ................... 29/132, 130, 129.5

[56] References Cited
UNITED STATES PATENTS

| | | | |
|---|---|---|---|
| 3,437,032 | 4/1969 | Manghirmaloni et al. | 29/132 X |
| 3,447,600 | 6/1969 | Greene | 29/132 X |
| 3,514,312 | 5/1970 | Gardiner | 29/132 X |
| 3,785,022 | 1/1974 | Bowling et al. | 29/132 |
| 3,800,366 | 4/1974 | Hill | 29/132 |
| 3,802,989 | 4/1974 | Huber | 29/132 X |

*Primary Examiner*—Alfred R. Guest

[57] ABSTRACT

A method of bonding rubber to magnesium and its alloys, which comprises cleaning and etching the metal surface, applying a coat of thermosetting nitrile-phenolic adhesive to the cleaned and etched metal surface, drying the adhesive, curing the adhesive to form an impervious film, and cooling the cured adhesive-bearing structure to room temperature. Then, applying a coat of the same adhesive to the surface of both the rubber to be bonded to the metal and to the cured film of adhesive on the metal, drying the coatings, associating the adhesive-coated parts in adhesive contacting relationship, and curing the uncured adhesive by sufficient heating while applying pressure thereto. Excellent printing rolls can be made this way.

2 Claims, 2 Drawing Figures

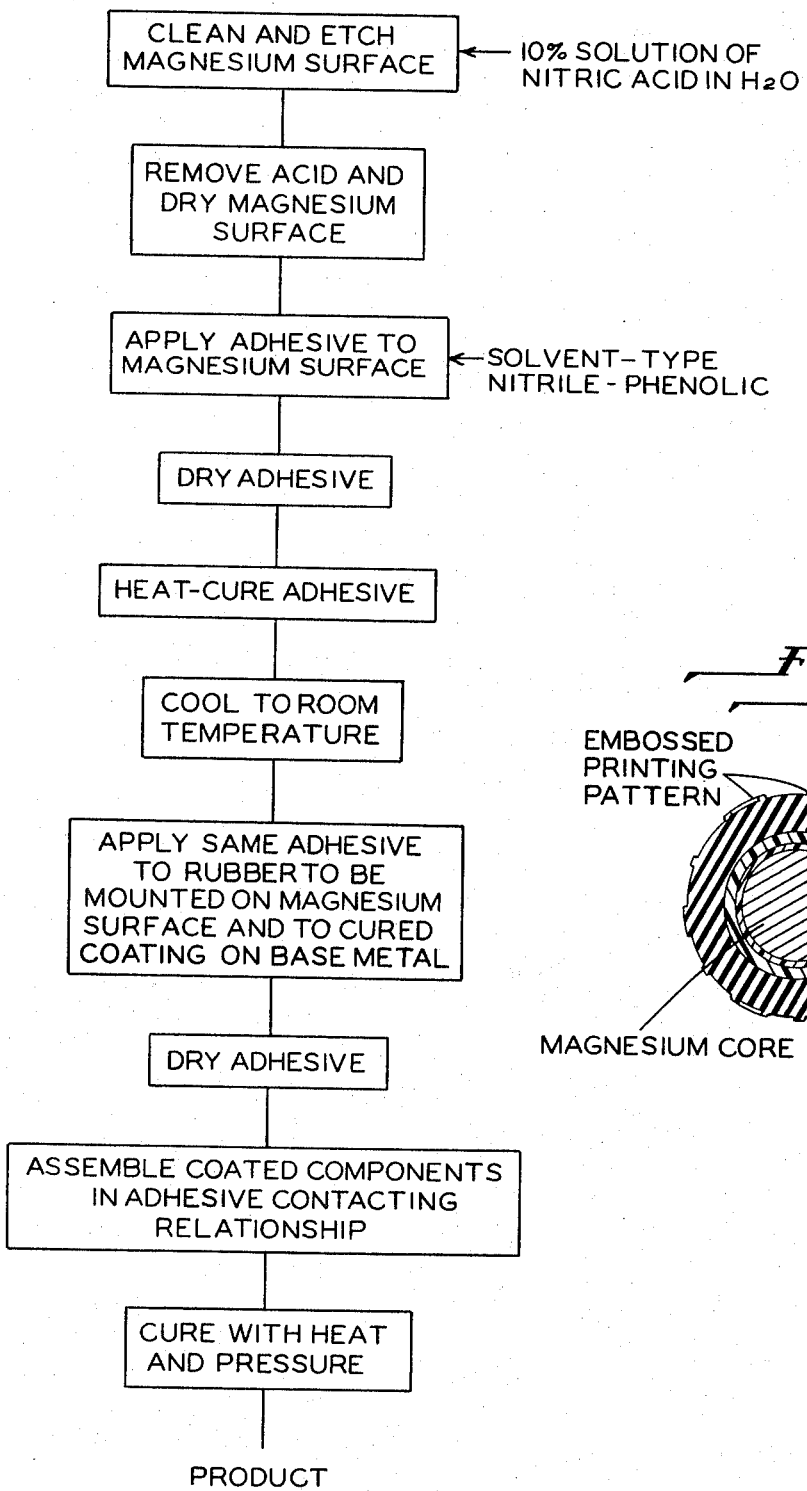
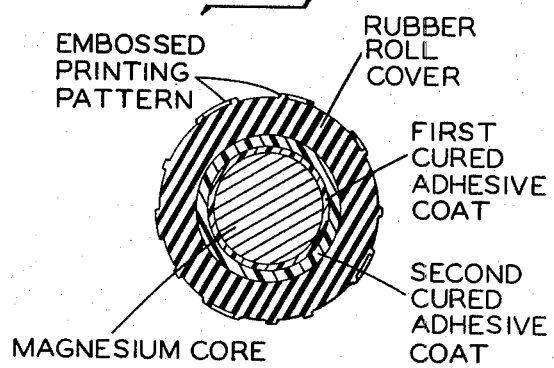

BONDING OF RUBBER TO MAGNESIUM AND ITS ALLOYS

CROSS-REFERENCE TO RELATED APPLICATION

This is a division, of application Ser. No. 225,432, filed Feb. 11, 1972 now U.S. Pat. No. 3,802,989 issued Apr. 9, 1974.

BACKGROUND OF THE INVENTION

1. Field of the Invention

This invention relates generally to the bonding of rubber to metal. More specifically, the invention is concerned with the bonding of rubber to magnesium and its alloys to make such products as printing rollers.

In printing rolls having an embossed rubber printing member bonded to a magnesium roll or core, it is extremely important that there be no loosening of the bond to maintain constant accuracy in placement of the print on the object being printed. By the method of this invention, the needed firm bond is accomplished by providing a cured barrier adhesive coating on the roll or core prior to the application and curing of the subsequently applied adhesive and rubber roll covering.

2. Description of the Prior Art

Prior methods of uniting rubber to metallic surfaces generally and to magnesium and its alloys in particular to make such items as printing rolls gave poor results because of the rapid oxidation of the metal surface and loosening of the bond between the rubber and the metal caused by exudation of plasticizer or oils from the rubber into the adhesive during curing.

In U.S. Pat. No. 2,872,366-Kiernan et al., the metal and the resin-rubber adhesive are preheated to partially cure the adhesive, and the outer vinyl film is brought into contact therewith and pressed together while the metal base is still hot.

In U.S. Pat. No. 2,812,278-Boger, the surface of the metal, which could be magnesium, is cleaned, rubbery adhesive is applied to the base and dried, and a layer of rubbery natural rubber or GR-S rubber cement containing a vulcanizing agent may be applied to the adhesive first coat. After the second adhesive coat has dried, the natural rubber or GR-S rubber mounting material is applied and the whole assembly cured.

In U.S. Pat. No. 3,154,432-Herrick, a barrier thermoset polymer layer is formed on a supporting base polycarbonate resin layer to protect it from solvents used in the top, thermoplastic polymer layer.

In U.S. Pat. No. 2,619,445-Kalafus, an adhesive is applied to a prepared surface and dried. A tie cement comprising a synthetic rubber, such as a butadiene-styrene rubber, may or may not be superimposed over the hardened coating. A vulcanizable rubber compound is thereafter cured in contact with the dried films to form a composite article.

In U.S. Pat. No. 2,650,185-Larson et al., an adhesive is dried and the adhesive-coated nylon base tape is laid on one metal surface and the other metal surface assembled on the tape, and the composite article is cured by heat and pressure.

In addition to not solving the previously stated disadvantages of the prior rubber-to-metal bonding processes, the foregoing methods offer no solution for protecting the adhesive bond while curing and achieving a uniform bond between the metal and the rubber in an improved and simple manner.

SUMMARY OF THE INVENTION

The magnesium surface is solvent wiped or vapor degreased, after which the entire magnesium surface is flooded with a 10 percent solution of nitric acid in $H_2O$. The etched magnesium surface is then immediately flooded with water until all traces of the acid are removed. The metal surface is then wiped dry. The entire etched magnesium surface is then coated with a heat curable, thermosetting, nitrile-phenolic adhesive which is first air dried, then force dried, and cured to form an impervious film. After cooling, both the rubber surface and the coated magnesium surface are coated with the same adhesive used to form the impervious film. These coatings are air dried at room temperature and then force dried, preferably in a circulating air oven for about 20 minutes at about 180° F. The coated parts are then assembled, adhesive-coated face to adhesive-coated face, and cured for preferably about 20 minutes at about 325° F. minimum glue line temperature while applying pressure to the parts bonded. The term "glue line temperature" as used herein designates the temperature achieved by the adhesive coatings during the heating operations.

The crux of the present invention is the presence of the cured film of thermosetting, nitrile-phenolic adhesive on the magnesium surface to prevent exudation of the plasticizer from the rubber from interfering with a good bond, and use of additional adhesive identical in composition with the cured film. Further, in the final curing of the assembled components, the adhesive coatings interposed between the cured adhesive coating on the roll and the outer rubber cover, flow together to form a single homogeneous layer containing some oils and plasticizer exuded from the rubber cover during the curing thereof. However, the previously cured coating applied directly to the roll surface, of course, does not combine in this manner with the other coatings during the curing process but remains substantially unchanged in its previously cured condition.

BRIEF DESCRIPTION OF THE DRAWING

In the drawings, FIG. 1 is a flow diagram of a method of this invention; and

FIG. 2 is an end elevational view in section of a product formed by the method of this invention.

DESCRIPTION OF THE PREFERRED EMBODIMENT

In making a printing roll assembly by bonding a patterned, vulcanized, or vulcanizable rubber roll covering to the surface of a magnesium roll or core, the rubber roll covering will usually have been previously provided with a surface pattern by known embossing methods for printing purposes. Such embossing may also be done simultaneously with the present bonding method, or subsequent thereto.

In the method of the present invention, protection from oil and plasticizer migration from the rubber roll cover to the magnesium surface is provided in the form of an adhesive film applied to the metal roll immediately after it has been cleaned and etched. The adhesive film is then cured by sufficient heat to form an impenetrable barrier to prevent loosening of the bond by plasticizers and oils present in subsequently applied components, and to provide an unusually receptive base for subsequent adherence of the later-applied adhesive. Preparation of the magnesium surface to receive the subsequently cured adhesive film includes degreasing the magnesium by means of solvent or vapor, flooding the entire magnesium surface with a 10 percent solution of nitric acid in $H_2O$, immediately flooding the etched magnesium surface with water until all traces of the acid are removed, and wiping the magnesium surface dry with a sterile cheese cloth or similar clean wiping cloths.

Immediately after cleaning, etching, and drying the magnesium surface of the roll, the entire surface is coated with the curable adhesive. The coating is then allowed to air dry at room temperature and then force dried for 20 minutes at 180° F. in a circulating air oven to eliminate the volatile components of the adhesive. The adhesive film is then cured, as by heating, for 30 minutes at 300° F. in a circulating air oven, and the adhesive-coated (cured) roll is allowed to cool to room temperature. A second coat of about the same thickness of the same adhesive is then applied to the cured adhesive film on the roll or core and is also applied to the inside surface of the rubber cover to be bonded to the metal roll. These coatings are allowed to air dry at room temperature and are then force dried in a circulating air oven for 20 minutes at 180° F. to remove the volatile solvents. The adhesive-coated components are then assembled in adhesive-contacting relationship and cured for 20 minutes at 325° F. glue line temperature, while applying pressure thereto by means of appropriate wrappings.

The thickness of any of the individual cured adhesive layers may be within the range of from about 2 to 6 mils with a total combined thickness of the adhesive layers being a maximum of about 12 mils. A thinner barrier layer on the metal would lack continuity and would not provide adequate protection from attack on the bond between the adhesive and the core by oily materials and plasticizer exuded from the rubber layer during final cure of the complete system. Cured combined adhesive layers thicker than about 12 mils unnecessarily increase costs and may contribute to possible longitudinal or circumferential movement or shifting of the roll cover during use.

The adhesive used in this invention is made in known manner by adding the nitrile rubber, the phenolic resin, and the desired compounding ingredients to a sufficient quantity of a volatile solvent to make a solution of proper consistency for any desired method of application such as brushing, spraying, or spreading.

Examples of suitable liquid carriers or solvents for the components of the adhesive are aromatic hydrocarbons such as benzene, toluene and xylene; chlorinated hydrocarbons such as trichloroethylene, perchloroethylene and propylene dichloride; ketones such as methyl ethyl ketone and methyl isobutyl ketone, and the like. The carrier is preferably volatile at room temperature so that it will evaporate from the applied adhesive within about 5-10 minutes at room temperature. Solids content will preferably range from about 20 percent to 30 percent by weight based on the total weight of the adhesive composition.

The adhesive to be used is essentially a composition comprising a synthetic rubber-like base material and a powdered thermosetting resin. For optimum results, a synthetic rubber will be used which is a copolymer of butadiene and acrylonitrile (NBR). Preferably, it will contain about 59 percent by weight butadiene and 41 percent acrylonitrile. The rubber stock is preferably compounded on a two roll rubber mill with curatives such as an activator, accelerator, vulcanizing agent, and antioxidant. A vulcanizing agent such as sulfur is aided by an accelerator such as mercaptobenzothiozole. Zinc oxide may be employed as an activator. As an anti-oxidizing agent, phenol-beta-naphthylamine or any of the age-resisting antioxidants used in the rubber industry may be used.

When the compounded rubber has cooled, the powdered, curable, thermosetting phenol-formaldehyde resin is blended with the rubber composition. The resin may be any thermosetting resin of the phenolic type, such as phenol-formaldehyde or cresyl-formaldehyde or mixtures thereof, made by the condensation of a phenol with formaldehyde. Preferably, the resin is either a single-stage phenol-formaldehyde (which needs only heat to cure) or a two-stage phenol-formaldehyde (which contains a curative agent such as hexamethylene tetramine), or more preferably, mixtures thereof.

Preferably, the resins are taken up in the solvents, and the compounded rubber is then cut into the solution, with agitation.

The rubber:resin ratio of the adhesive bonding material should be in the range of about 1:0.5 to 1.5 for the purpose of use in this invention. The bonding materials with a high rubber content are more flexible but weaker as adhesives, while the bonding materials with a high resin content are more brittle but have a higher bond strength.

Rubber bodies that may be bonded to metals according to the present invention include synthetic rubbers. The rubber may be polar; that is, it may be a synthetic elastomer having recurring functional groups, such as chlorine or nitrile radicals, in the polymer chain. Examples of such polar rubbers are polychloroprene (poly 2-chlorobutadiene-1,3) and nitrile rubbers (copolymers of butadiene and acrylonitrile, NBR). The rubber may be essentially non-polar such as the hydrocarbon rubbers of butyl rubber, styrene butadiene copolymers (SBR), and the like.

The metal surfaces which may be bonded to the rubber body according to the present invention are magnesium and magnesium alloys containing over about 85 percent by weight magnesium.

By using the same adhesive for the first-cured film on the metal base as that used in the rest of the system, substantially the same bond strength between the rubber and the metal is maintained or improved.

The following example illustrates an embodiment of the invention. All parts are by weight unless otherwise specified.

Example

The following adhesive formulation was prepared.

| Ingredients | Parts |
| --- | --- |
| Butadiene acrylonitrile copolymer, 41% acrylonitrile (Hycar 1001) | 40.50 |
| Sulfur | 0.40 |
| Zinc oxide | 2.00 |
| N-phenyl-beta-naphthylamine, antioxidant | 2.00 |
| Black pigment | 20.25 |
| 2-Mercaptobenzothiazole | 0.40 |
| Phenol-formaldehyde heat reactive resin, containing hexamethylene tetramine (Durez 12687) | 20.50 |
| Phenol-formaldehyde resin, fusible, | 41.00 |

Example-Continued

The following adhesive formulation was prepared.

| Ingredients | Parts |
| --- | --- |
| containing hexamethylene tetramine, neutralized (Durez 7031-A) | |
| Monochlorobenzene | 119.50 |
| Methyl ethyl ketone | 243.00 |

After cleaning and etching the surface of a magnesium roll with a 10 percent nitric acid wash, a 10 mil thick wet coat of the above adhesive was applied to the washed and dried surface thereof. The film was air dried at room temperature and then force dried for 20 minutes at 180° F. in a circulating air oven. The film was then cured for 30 minutes at 300° F. in a circulating air oven, to produce a 2.5–3 mil dry coat, after which the cured adhesive-coated roll was allowed to cool to room temperature.

The inner surface of a rubber roll cover to be bonded to the metal roll was then brush-coated with a similar thickness of the same adhesive, a similar second brush coat of the adhesive was applied to the cured film on the roll, and the coatings were they allowed to dry at room temperature. This was followed by force drying these adhesives in a circulating air oven for 20 minutes at 180° F., after which the coated parts were assembled adhesive-coated face to adhesive-coated face and cured for 20 minutes at 325° F. minimum glue line temperature while applying pressure from wrappings to the parts being bonded. An excellent bond was achieved between the roll cover and the roll. The first-applied and cured adhesive coat functioned as an impenetrable barrier during the curing operation and prevented any loosening of the bond which would normally have occurred because of migration of plasticizer and oil from the rubber through the adhesive.

What is claimed is:

1. A printing roll comprising an outer patterned and cured synthetic rubber cover, an etched inner magnesium core, and layers of cured adhesive interposed between said outer cover and inner core, said layers of adhesive comprising a first-cured impermeable barrier layer bonded to said magnesium core, and a second-cured layer of the same adhesive interposed between and bonding said impermeable layer to said rubber cover, the composition of said adhesive layers comprising a phenol-formaldehyde resin and a butadiene-acrylonitrile copolymer.

2. The printing roll of claim 1 wherein the composition of the adhesive layers includes about 59 percent butadiene and about 41 percent acrylonitrile, and wherein the rubber:resin ratio is in the range of from about 1:05 to 1.5.

* * * * *

UNITED STATES PATENT OFFICE
CERTIFICATE OF CORRECTION

Patent No. 3,859,701      Dated January 14, 1975

Inventor(s) Raymond B. Huber

It is certified that error appears in the above-identified patent and that said Letters Patent are hereby corrected as shown below:

Column 6, line 26, the rubber:resin ratio range which now reads "1:05 to 1.5" should read --1:0.5 to 1.5--.

Signed and sealed this 29th day of April 1975.

(SEAL)
Attest:

RUTH C. MASON
Attesting Officer

C. MARSHALL DANN
Commissioner of Patents
and Trademarks